July 28, 1942.   H. O. PETERSON   2,291,558
FREQUENCY MONITOR
Filed Nov. 14, 1940
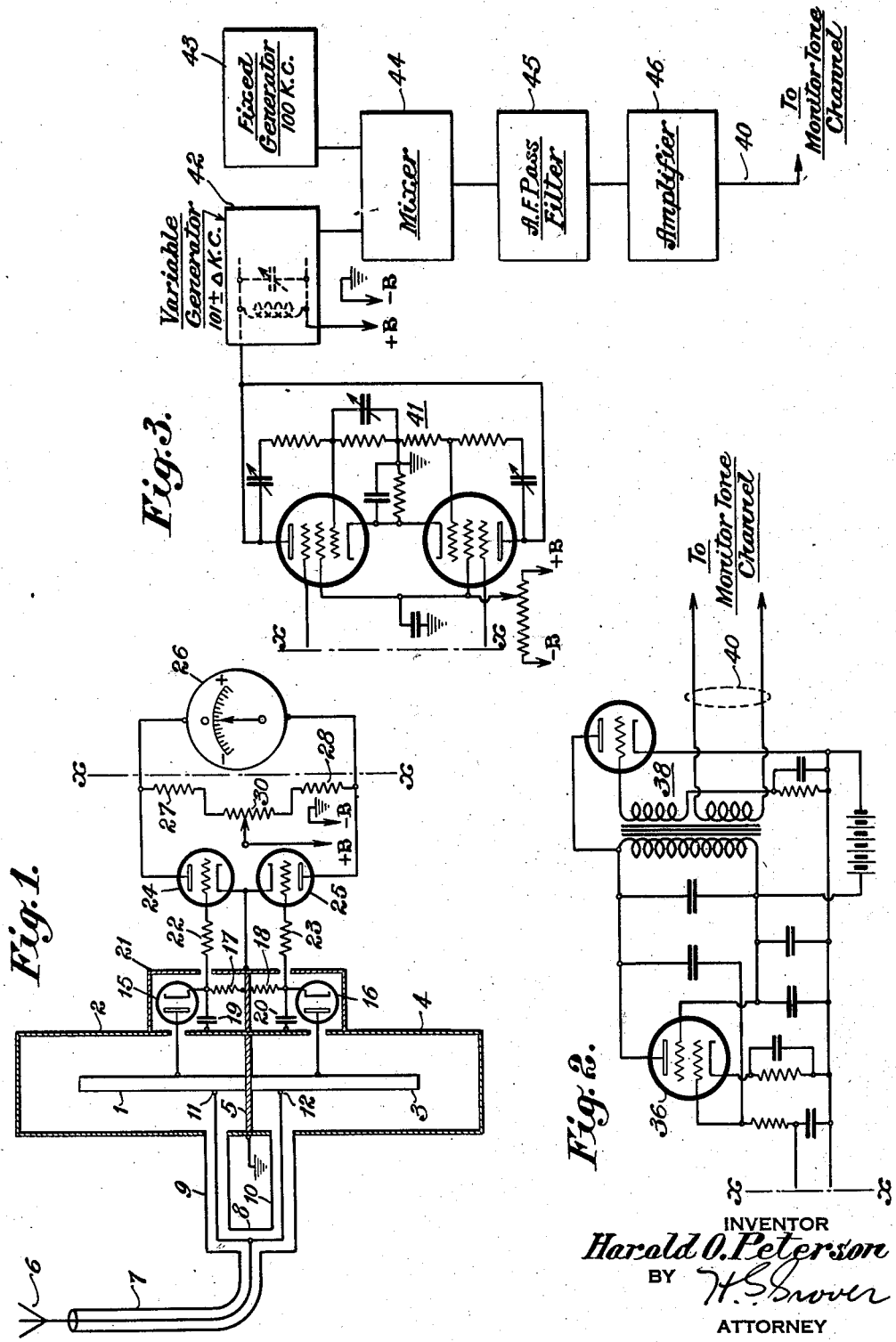
INVENTOR
Harold O. Peterson
BY
ATTORNEY Patented July 28, 1942

2,291,558

UNITED STATES PATENT OFFICE 2,291,558

FREQUENCY MONITOR

Harold O. Peterson, Riverhead, N. Y., assignor to Radio Corporation of America, a corporation of Delaware Application November 14, 1940, Serial No. 365,584

13 Claims. (Cl. 250—39)

The present invention relates to a means for detecting variations in frequency of a transmitter from its assigned frequency.

An object of the present invention is the provision of a frequency monitor in which the resonant circuits do not utilize lumped circuit elements.

Another object is the provision of a frequency monitor in which the resonators therein are substantially completely uncoupled one from the other.

A further object is the provision of a frequency monitor having an indicator which is direct reading in frequency departure from a predetermined value.

Still a further object is the provision of a frequency monitor, as aforesaid, in which the scale of said indicator is linearly calibrated.

The present invention includes as features of its construction a pair of concentric line resonators tuned above and below a desired frequency and so adjusted that the resonance curves intersect at about 75% of the peak voltage values developed. The voltages developed in the resonators are separately rectified and applied through logarithmic instrument circuits in opposing senses to a zero center voltmeter having a linear scale thereon which may be calibrated in each direction from the center directly in kilocycles departure from the desired frequency.

Further objects, features and advantages of the present invention will be more fully understood from the following detailed description which is accompanied by a drawing in which Figure 1 shows the circuit diagram of an embodiment of the invention, Figure 2 shows a modification of a portion of Figure 1, while Figure 3 shows a further modification of Figure 2.

Referring, now, to Figure 1, there is shown therein a pair of concentric line resonators, one comprising an inner conductor 1, and an outer shell 2, and the other an inner conductor 3 and an outer shell 4. The inner conductors 1 and 3 are approximately a quarter wavelength long at the desired resonant frequency. The inner conductors 1 and 3 of the resonators are grounded to ground plate 5.

While I have shown the two resonators as arranged in an end to end relationship, they may be positioned in a side by side relationship on a larger ground plate or any other relative arrangement desired may be used.

The radiated wave of the transmitter which is to be monitored is received on antenna 6 and conducted through transmission line 7 to the resonators 1, 2 and 3, 4. The transmission line 7 is split at 8 into two branches 9 and 10 and the inner conductors of the branches are connected to the inner conductors of the resonators at points 11 and 12. The lengths of the branches 9, 10 are such that the distance from point 11 through point 8 to point 12 is approximately a quarter of the mean operating wavelength. The length of branches 9 and 10 are thus chosen in order that there will be a minimum tendency for the branches to couple energy from one resonator to the other.

One of the resonators, for example, the one composed of inner conductor 1 and outer shell 2 is tuned to a frequency above the desired or predetermined standard of frequency and the other composed of inner conductor 3 and outer shell 4 is tuned to a frequency below the desired or predetermined standard of frequency. The tuning of the two resonators is so adjusted, that is, the peak frequencies are so spaced that the resonance curves of the two resonators intersect at a point equivalent to about 75% of the peak voltage values developed by the resonators.

Diode rectifiers 15 and 16 are connected to the inner conductors of the resonators and serve to rectify the oscillatory voltage in the resonators. The point of connection of the rectifiers to the inner conductors 1, 3 may be varied if desired to change the coupling of the load to the resonators. An increased coupling will broaden the tuning of the resonators and provide, within limits, for a wider operating range. Load resistors 17 and 18 are by-passed by condensers 19 and 20 for the radio frequency. The direct voltages developed across resistors 17 and 18 are applied through resistors 22 and 23 to the grids of vacuum tubes 24 and 25. In the load circuits of vacuum tubes 24 and 25 are placed an indicating instrument 26 and load resistors 27 and 28. The potentiometer 30 connecting load resistors 27 and 28 and having its moving connection connected to a source of anode potential serves to afford a means for adjusting the circuit to obtain a zero reading on the instrument when the frequency is correct. Diodes 15 and 16 are contained within a grounded shield chamber 21 in order to avoid stray field pick-up which would lead to erroneous results. It will be noted that the direct voltages across the diode load resistors 17 and 18 impress positive voltage on the grids of tubes 24 and 25. The impressed positive voltage causes grid current to flow through resistors 22 and 23 but the voltage drop in resistors 22 and 23 is so adjusted that plate current of tubes 24 and 25 increases approximately as a logarithmic function of the voltages developed in resistors 17 and 18. In practice, resistors 22 and 23 may be on the order of ten times or more greater than the value of resistors 17 and 18. With a logarithmic relationship between the direct current voltage across resistors 17 and 18 and the plate currents in tubes 24 and 25, the deflection of the indicating instrument 26 from its zero center is proportional to the departure of the transmitter frequency from the frequency to which the cross-over point of the monitor circuit is adjusted over a considerable range of input voltage. The instrument 26 may, therefore, be directly calibrated on a linear scale in terms of kilocycles, for instance. The instrument 26 may be directly calibrated on a linear scale because of the logarithmic relationship described above. The logarithmic transducer arrangement causes the deflection of the indicating instrument to be directly proportional to the deviation of the frequency of the wave applied to the resonators from a predetermined standard frequency. The following explanation makes this relationship apparent. Consider the sloping portions of the resonance curves of resonators 1 and 3 as intersecting at a point which will be known as $E_0$. Then, at a frequency differing from the cross-over point the potential $E_1$ on resonator 1 is given by the following equation:

$$E_1 = E_0 + K\Delta f$$

where $\Delta f$ is the change in frequency. The potential $E_3$ on resonator 3 is likewise given by the equation:

$$E_3 = E_0 - K\Delta f$$

From the two foregoing equations the following proportion may be set up:

$$\frac{E_1}{E_3} = \frac{1 + \frac{K}{E_0}\Delta f}{1 - \frac{K}{E_0}\Delta f}$$

Then, since $$\frac{K}{E_0}$$

is small over the operating range of the device the foregoing proportion may be written as the following approximation:

$$\frac{E_1}{E_3} \approx 1 + 2\frac{K}{E_0}\Delta f$$

Furthermore, still considering the quantity $$\frac{K}{E_0}$$

as small, the above approximation may be written in logarithmic form as:

$$\log_e \frac{E_1}{E_3} \approx 2\frac{K}{E_0}\Delta f$$

Then, since the meter deflection $i_m$ is, due to the logarithmic transducer, proportional to the logarithm of the input potential it, therefore, follows that $i_m$ is proportional to $$\frac{2K}{E_0}\Delta f$$

I have not indicated in the diagram the means for heating the cathodes of the tubes 15, 16, 24 and 25 since conventional cathode heating means are well understood in the art. Filamentary cathode tubes may be used if desired.

If it is desired to have the indication of transmitter frequency departure appear at a location remote from the location of the monitoring device, the circuit of Figure 1 may be modified to the right of dotted line, X, X, as shown in Figure 2. The voltage developed between the plates of tubes 24 and 25 is, in Figure 2, applied to the control electrode of the reactance tube 36. Reactance tube 36 is coupled to an oscillator circuit indicated generally by reference numeral 38 in such a way that variations in potential applied to the control electrode of tube 36 cause a change in the frequency generated by oscillator 38. The tone generated by oscillator 38 is applied through an output circuit to a monitor tone channel which carries the tone to a remote point where the indication is to be read. At this location, the received tone is applied to any desired type of frequency responsive indicating means.

The tone received at the remote point has a frequency which is dependent on whether or not the grids of tubes 18 and 19 receive equal voltages and the variation in tone received at the remote point is proportional to the departure of the signal received by antenna 1 from the predetermined cross-over frequency for which resonators 1, 2 and 3, 4 are adjusted.

In the further modification shown in Figure 3 I have shown the use of a balanced reactance tube circuit 41, of the type shown and more fully described in Crosby application #311,074, filed December 27, 1939, to which reference may be made for a complete description of its operation. In the present case it is believed only necessary to point out that the differentially varying voltages from the opposite ends of resistors 27 and 28 are applied to the control electrodes of separate differentially acting reactance tubes. The varying reactive effect is, in this modification, applied to a variable radio frequency oscillator indicated generally by box 42 to vary the generated frequency an amount $\Delta$ above and below the assumed exemplary 101 kc. This variable frequency oscillator is then mixed with a fixed 100 k. c. oscillation from generator 43 in a mixer stage 44 which may include in its output a filter 45 to pass only the resulting audio frequency note. This note is, if necessary, amplified by amplifier 46 and then applied to the monitor tone channel as indicated by character 40.

While I have shown and particularly described several modifications of my invention, it is to be distinctly understood that my invention is not limited thereto but may be varied within the scope of the invention.

I claim:

1. A frequency monitor having a pair of resonant circuits tuned to frequencies above and below a predetermined standard, and means for applying a wave to be measured to said circuits, said means comprising a conductor connected between points on said resonant circuits and means for connecting a source of said wave to an intermediate point on said conductor, the length of said conductor from one circuit to the other being an odd multiple, including unity, of one quarter of the wavelength of said standard whereby said circuits are uncoupled one from the other.

2. A frequency monitor having a pair of resonators, each comprising an inner conductor and an outer shell surrounding said conductor, said resonators being tuned to frequencies above and below a predetermined standard frequency and means for applying a wave to be measured to said resonators, said means comprising a transmission line connected between points on said resonators and means for connecting a source of said wave to an intermediate point on said transmission line, the length of said transmisison line from one resonator being an odd multiple, including unity, of one quarter of the wavelength of said standard frequency whereby said resonators are substantially uncoupled one from the other at said standard frequency.

3. A frequency monitor having a pair of resonant circuits tuned to frequencies above and below a predetermined standard frequency, and means for applying a wave to be measured to said circuits, said means comprising a conductor connected between points on said resonant circuits and the means for connecting a source of said wave to an intermediate point on said conductor, the length of said conductor from one circuit to the other being an odd multiple, including unity, of one quarter of the wavelength of said standard frequency whereby said circuits are uncoupled one from the other, said circuits being so tuned that the point of intersection of the resonance curves thereof occurs at a value equal to 75% of the peak value.

4. A frequency monitor having a pair of resonators, each comprising a section of coaxial lines having an inner conductor and an outer shell, the lengths of said inner conductors being so adjusted that said resonators are tuned to frequencies above and below a predetermined standard frequency, the point of intersection of the resonance curves of said resonators occurring at a value equal to 75% of the peak value, and means for applying a wave to be measured to said resonators, said means comprising a transmission line connected between points on each of said inner conductors and means for connecting a source of said wave to an intermediate point on said transmission line, the length of said line from one inner conductor to the other being an odd multiple, including unity, of one quarter of the wavelength of said standard frequency whereby said resonators are uncoupled one from the other.

5. A frequency monitor having a pair of resonators, each comprising a section of coaxial line having an inner conductor and an outer shell, the lengths of said inner conductors being so adjusted that said resonators are tuned to frequencies above and below a predetermined standard frequency, the point of intersection of the resonance curves of said resonators occurring at a value equal to 75% of the peak value, and means for applying a wave to be measured to said resonators, said means comprising a transmission line connected between points on each of said inner conductors and means for connecting a source of said wave to an intermediate point on said transmission line, the length of said line from one inner conductor to the other being an odd multiple, including unity, of one quarter of the wavelength of said standard frequency whereby said resonators are uncoupled one from the other, said resonators being arranged in an end to end relationship with a shielding plate therebetween.

6. A frequency monitor having a pair of resonant circuits tuned to frequencies above and below a predetermined standard frequency, and means for applying a wave to be measured to said circuits, said means comprising a conductor connected between points on said resonant circuits and means for connecting a source of said wave to an intermediate point on said conductor, the length of said conductor from one circuit to the other being an odd multiple, including unity, of one quarter of the wavelength of said standard frequency whereby said circuits are uncoupled one from the other, means for developing direct potentials proportional to the alternating potentials developed by said wave in said circuits, means for developing currents proportional to the logarithm of each of said direct potentials, and means for obtaining an indication proportional to the difference of said currents.

7. A frequency monitor having a pair of resonators, each comprising a section of coaxial line having an inner conductor and an outer shell, the lengths of said inner conductors being such that said resonators are so tuned to frequencies above and below a predetermined standard frequency that the point of intersection of the resonance curves of said resonators occurs at a value equal to 75% of the peak value, and means for applying a wave to be measured to said resonators, said means comprising a transmission line connected to each of said inner conductors, and means for connecting a source of said wave to an intermediate point on said transmission lines, the length of said line from one inner conductor to the other being an odd multiple, including unity, of one quarter of the wavelength of said standard frequency whereby said resonators are uncoupled one from the other, means for developing direct potentials proportional to the alternating potentials developed by said wave in said circuits, means for developing currents proportional to the logarithm of each of said direct potentials and means for obtaining an indication proportional to the difference of said currents.

8. A frequency monitor having a pair of resonators, each comprising a section of coaxial lines having an inner conductor and an outer shell, the lengths of said inner conductors being such that said resonators are so tuned to frequencies above and below a predetermined standard frequency that the point of intersection of the resonance curves of said resonators occurs at a value equal to 75% of the peak value, and means for applying a wave to be measured to said resonators, said means comprising a transmission line connected to each of said inner conductors and means for connecting a source of said wave to an intermediate point on said transmission line, the length of said line from one inner conductor to the other being an odd multiple, including unity, of one quarter of the wavelength of said standard frequency whereby said resonators are uncoupled one from the other, said resonators being arranged in an end to end relationship with a shielding plate therebetween, a pair of rectifiers within a shield adjacent to said resonators, connections from each of said inner conductors to said rectifiers, a load resistor connected to each of said rectifiers, means for developing voltages proportional to the logarithm of the voltages developed across each of said load resistors, means for combining said first mentioned voltages in an opposing relationship and means for indicating the difference therebetween said last mentioned means comprising a zero center voltmeter.

9. A frequency monitor having a pair of resonant circuits tuned to freqencies above and below a predetermined standard frequency, and means for applying a wave to be measured to said circuits, said means comprising a conductor connected between points on said resonant circuits, and means for connecting a source of said wave to an intermediate point on said conductor, the length of said conductor from one circuit to the other being an odd multiple, including unity, of one quarter of the wavelength of said standard frequency whereby said circuits are uncoupled one from the other, said circuits being so tuned that the point of intersection of the resonance curves thereof occurs at a value equal to 75% of the peak value, means for developing direct potentials proportional to the alternating potentials developed by said wave in said circuits, means for developing currents proportional to the logarithm of each of said direct potentials, and means for obtaining an indication proportional to the difference of said currents.

10. A frequency responsive system including a pair of resonant circuits one tuned above, and the other tuned below a predetermined frequency, a conductor connected between points on said circuits, and means for applying a wave to an intermediate point on said conductor, the length of said conductor from one circuit to the other being so related to the wavelength of said predetermined frequency that said conductor presents to each of said circuits a high impedance to said predetermined frequency whereby said circuits are uncoupled one from the other at said frequency.

11. A frequency monitor having a pair of resonators each comprising an inner conductor and an outer shell surrounding said conductor, said resonators being tuned to frequencies above and below a predetermined standard frequency, and means for applying a wave to be measured to said resonators, said means comprising a transmission line connected to said resonators, and means for connecting a source of said wave to an intermediate point on said transmission line, the length of said line from one resonator to the other being so related to the wavelength of said standard frequency that said transmission line presents a high impedance to said standard frequency whereby said resonators are uncoupled one from the other at said standard frequency.

12. A frequency responsive system having a pair of resonant circuits, one tuned above, and the other tuned below, a predetermined frequency, means for applying a wave to said circuits, means for developing direct potentials proportional to the alternating potentials developed by said wave in said circuits, means for developing currents proportional to the logarithm of each of said direct potentials and means responsive to the difference of said currents.

13. A frequency monitor having a pair of resonant circuits tuned to frequencies above and below a predetermined standard, means for applying a wave to be measured to said circuits, means for developing direct potentials proportional to the alternating potentials developed by said wave in said circuits, means for developing currents proportional to the logarithm of each of said direct potentials and means for obtaining an indication proportional to the difference of said currents.

HAROLD O. PETERSON.